Feb. 21, 1933.  E. P. WOOD ET AL  1,898,705
APPARATUS FOR FEEDING MOLTEN GLASS
Filed Oct. 1, 1930
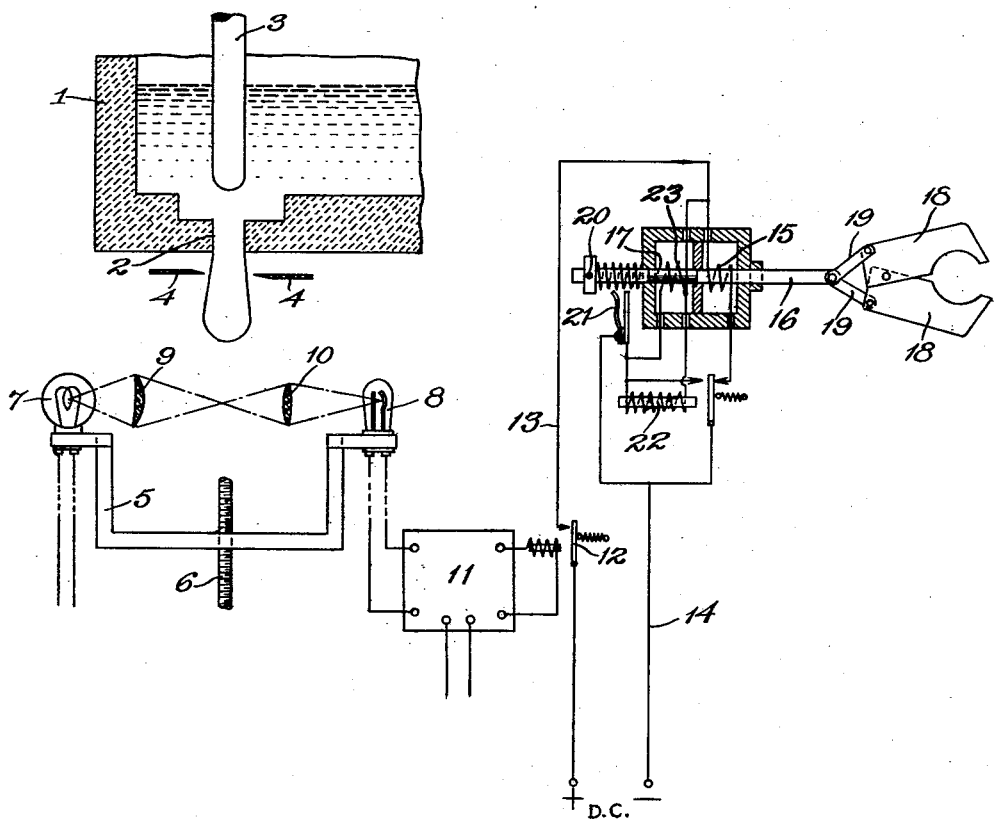
INVENTORS
Edmund P. Wood
BY William Carl Osterbrock
Wood x Wood ATTORNEYS Patented Feb. 21, 1933

1,898,705

UNITED STATES PATENT OFFICE

EDMUND P. WOOD AND WILLIAM CARL OSTERBROCK, OF CINCINNATI, OHIO

APPARATUS FOR FEEDING MOLTEN GLASS

Application filed October 1, 1930. Serial No. 485,730.

This invention relates to a method and apparatus for feeding suspended mold charges of molten glass. The mechanism and method of the invention are disclosed in relation to a glass feeder in which there is a submerged orifice, means such as a plunger for producing pulsations of glass through the orifice, shears located just below the orifice but spaced therefrom for cutting off the mold charges suspended from the orifice. The apparatus is equally suitable for use with a feeder of the type wherein the pulsations are produced by variations of pneumatic pressure above the orifice or with other types of suspended charge feeder.

The invention particularly relates to the mechanism for causing the shears to act at the appropriate times to cut off the suspended mold charges. It is the present practice with feeders of the type described to synchronize the shears with the action of the plunger or other glass impelling means and to provide mechanism to render this synchronization adjustable during the continued operation of the feeder to regulate the length of the mold charges and to compensate for changes in the viscosity of the glass. This practice, which has been called phase-changing, has proven very unsatisfactory, bothersome and inexpedient in many factories so that there exists at present an appreciable demand for some system of regulating the length of mold charges without phase changing. The present invention in the broadest aspect involves the use of an electrical phenomena produced by the lower tip of the depending mold charge, which electrical phenomena serves to trip the shears to cut off the charge. The electrical mechanism is adjustable in the general path of the descent of the gob but is spaced from the gob so that the gob does not touch any chilling body prior to its introduction into the mold.

One example of electrical mechanism suitable to carry out this concept is disclosed in the accompanying diagrammatic drawing.

As disclosed, the mechanism comprises means for producing a beam of light and a photo-electric cell aligned with the beam of light, said instrumentalities vertically adjustable as a unit so that the beam of light is positioned to be intercepted by the tips of the depending mold charges successively. The drawing also discloses a type of electrical shear which is suitable for use with a device of this sort, though the electrical phenomena caused by the depending gobs of glass can be used to trip pneumatic, hydraulic or mechanical shears just as well. It is also to be noted that the electrical shears disclosed are susceptible to use without the photo-electric apparatus.

The above described combination of a photo-electric cell and a beam of light is disclosed to exemplify the invention for the reason that at the present time the photo-electric cells are much more sensitive to short wave lengths on the blue side of the spectrum than to the longer wave lengths on the red side of the spectrum. The molten glass emanates light in which the red is very predominant and is therefore not highly adapted for operating the photo-electric cells most commonly available at present. The mold charge, despite its redish emanation, provides sufficient shadow when it intercepts the beam of light to modify the potential in the photo-electric cell circuit. Therefore, the embodiment utilizing the most available types of photo-electric cells is at present preferred.

The feeder disclosed comprises a container for molten glass 1 provided with a flow outlet 2. It is customary to use interchangeable flow rings of different sizes in a feeder of this sort though the interchangeable flow ring mechanism is not disclosed in the diagrammatic view.

Above the flow outlet is a reciprocating plunger 3, the effect of which is to alternately accelerate the flow of glass and draw back the stub of glass after the depending charge has been severed. Below the flow outlet and slightly spaced therefrom are lines designated at 4 which illustrate diagrammatically the position of the shear blades, though for the sake of convenience, the shearing mechanism is shown in the drawing to the right of the container. The shearing mechanism is preferably vertically adjustable in relation to the outlet. Mounted below the flow orifice is a bracket 5 which is vertically adjustable by means of a screw 6. Any one of a great variety of mechanisms can be used for raising or lowering the bracket and the representation is but diagrammatic.

On one end of the bracket is mounted an electric lamp 7 and on the other end of the bracket a photo-electric cell 8. Between the lamp and the photo-electric cell are two lenses 9 and 10, the first to concentrate the light from the lamp into a narrow beam, reaching its narrowest dimension directly under the center of the flow outlet, the other of which is used to concentrate this beam on the desired spot on the photo-electric cell. Connected to the photo-electric cell is a relay 11. The source of current supplying the lamp, the relay and the photo-electric cell is not shown on the diagrammatic view. The wiring of the relay is so arranged that when the beam of light falling upon the photo-electric cell is interrupted, the relay switch 12 is closed and the DC current carried by lines 13 and 14 passes through the shear solenoid 15, the effect of which is to draw forwardly the shear rod 16 inasmuch as the rod is provided with a soft iron portion 17 which is drawn into the magnetic coil when the current is passed therethrough. The drawing forward of the rod causes the notched shear blades 18 to close because they are pivoted together upon a relatively stationary pivot and pinned to the rod at their outer edges by means of links 19. Of course many other types of shears can be used other than the ones disclosed.

As soon as the rod 16 moves forwardly far enough to close the blades, an adjustable head 20 on the end of the rod strikes a switch 21 which closes the circuit through the relay 22 which throws the forward magnet for operating shears out of the circuit and throws a rear magnet 23 into circuit so that the rod is drawn backwardly by the rear magnet and the shears are held in open position until the entire mold charge has passed through the beam of light after which relay switch 12 opens which breaks the circuit to the second relay 22 and returns it likewise to its original position so that the forward shear magnet will operate when the beam of light is again intercepted.

In operation, the beam of light is set at a distance from the shears equal to the length of the desired mould charge. When the plunger operates the mold charge depends. The plunger must be given adjustments as to height of stroke, length of stroke and speed of stroke to produce a charge of the desired weight at the given length. Therefore, when the tip of the depending charge intercepts the beam of light, the plunger is somewhere about its lowermost position usually just starting to rise, and the charge is in condition to be severed. If the glass becomes slightly hotter than it has been, there is a tendency for the charges to increase in weight. With apparatus of this sort, however, substantial uniformity of weight is maintained because the hotter glass tends to depend more rapidly and the charges are severed before quite so much glass has passed the flow ring.

The converse action takes place if the glass tends to become cooler. This method of severing mold charges therefore has inherent in it certain compensatory features which tend to maintain uniformity of mold charges in the face of varying glass temperatures within certain limits.

Above all, this invention takes the selection for the time of severance out of the control of the machine operator who may be very unwise and unskillful in his handling of the machine, and causes each drop of glass to time its own cutting-off so that there is no constant time between expulsion and severance.

Having described our invention, we desire to be limited only by the ensuing claims:

1. In a glass feeder of the suspended charge type, a self-timing shear for cutting-off successively depending mold charges, said self-timing shear, comprising, a pair of shear blades positioned below the support for the depending mold charges, a pair of magnets adapted to open and close said shear blades, means for producing a beam of light adapted to be intercepted by the lower tips of the depending mold charges successively, a photo-electric cell positioned so that the beam of light falls upon it, said photo-electric cell more sensitive to said beam of light than to the light emanating by the molten mold charges, a relay adapted to be operated by the photo-electric cell so that the relay switch is closed when the beam of light is intercepted, said switch adapted to energize the magnet adapted to close the shears, and means for de-energizing said magnet and energizing the second magnet adapted to open the shears after the shears have been closed.

2. In a glass feeder in which mold charges of molten glass are suspended in rhythmic suspension from a support, shears spaced below said support, means for operating said shears, and timing means for timing the operation of said shears, said timing means comprising an electrical instrument, and a device in circuit with it, said device associated with the shear operating mechanism, said electrical instrument adjustably mounted below the shearing mechanism adjacent to but out of the path of the descending mold charges, said electrical instrument adapted to control a current flow therethrough to modify a potential applied to said device when the tip of a descending mold charge reaches the level of said instrument, said device adapted to be operated by said modification of potential to cause the shears to be operated to sever the suspended mold charge.

3. In a glass feeder in which mold charges of molten glass are suspended in rhythmic suspension from a support, shears spaced below said support, means for operating said shears, and timing means for timing the operation of said shears, said timing means comprising a photo-electric cell, and a magnetic device in circuit with it, said magnetic device associated with the shear operating mechanism, said photo-electric cell adjustably mounted below the shearing mechanism adjacent to but out of the path of the descending mold charges, said photo-electric cell adapted to control a current flow therethrough to modify a potential applied to said magnetic device when the tip of a descending mold charge reaches the level of said photo-electric cell, said magnetic device adapted to be operated by said modification of potential to cause the shears to be operated to sever the suspended mold charge.

4. In a glass feeder in which mold charges of molten glass are suspended in rhythmic suspension from a support, shears spaced below said support, means for operating said shears, and timing means for timing the operation of said shears, said means comprising means for producing a beam of light, a photo-electric cell, and a magnetic device, said photo-electric cell and magnetic device in circuit with each other, the magnetic device associated with the shear operating mechanism, the beam of light in the path of the descending mold charges and adapted to be intercepted by them, the photo-electric cell positioned in the shadow cast by the interception of the beam of light by the descending mold charge and electrically sensitive to said shadow so that when the tip of a descending mold charge intercepts said beam of light the current of the circuit including the photo-electric cell and the magnetic device associated with the shearing mechanism is modified to cause the shears to be operated to sever the suspended mold charge.

5. In a glass feeder in which mold charges of molten glass are suspended in rhythmic suspension from a support, shears spaced below said support, mechanism for operating said shears including a trip and timing means for timing the operation of said shears, said timing means comprising a photo-electric cell, and a magnetic device in circuit with it, said magnetic device associated with the trip of the shear operating mechanism, said photo-electric cell adjustably mounted below the shearing mechanism adjacent to but out of the path of the descending mold charges, said photo-electric cell adapted to control a current flow therethrough to modify a potential applied to said magnetic device when the tip of a descending mold charge reaches the level of said photo-electric cell, said magnetic device adapted to be operated by said modification of potential to trip the shears for severing the suspended mold charge.

6. In a glass feeder in which mold charges of molten glass are suspended in rhythmic suspension from a support, shears spaced below said support, mechanism for operating said shears including a trip and timing means for timing the operation of said shears, said means comprising means for producing a beam of light, a photo-electric cell, and a magnetic device, said photo-electric cell and magnetic device in circuit with each other, the magnetic device associated with the trip of the shear operating mechanism, the beam of light in the path of the descending mold charges and adapted to be intercepted by them, the photo-electric cell positioned in the shadow cast by the interception of the beam of light by the descending mold charge and electrically sensitive to said shadow so that when the tip of a descending mold charge intercepts said beam of light the current of the circuit including the photo-electric cell and the magnetic device is modified to cause the magnetic device to operate the trip so that the shears sever the suspended mold charge.

In witness whereof, we hereunto subscribe our names.

EDMUND P. WOOD.
WILLIAM CARL OSTERBROCK.